Feb. 17, 1925.
G. R. WOOD
COMPUTING MACHINE
Filed July 19, 1919    8 Sheets-Sheet 3
1,526,576
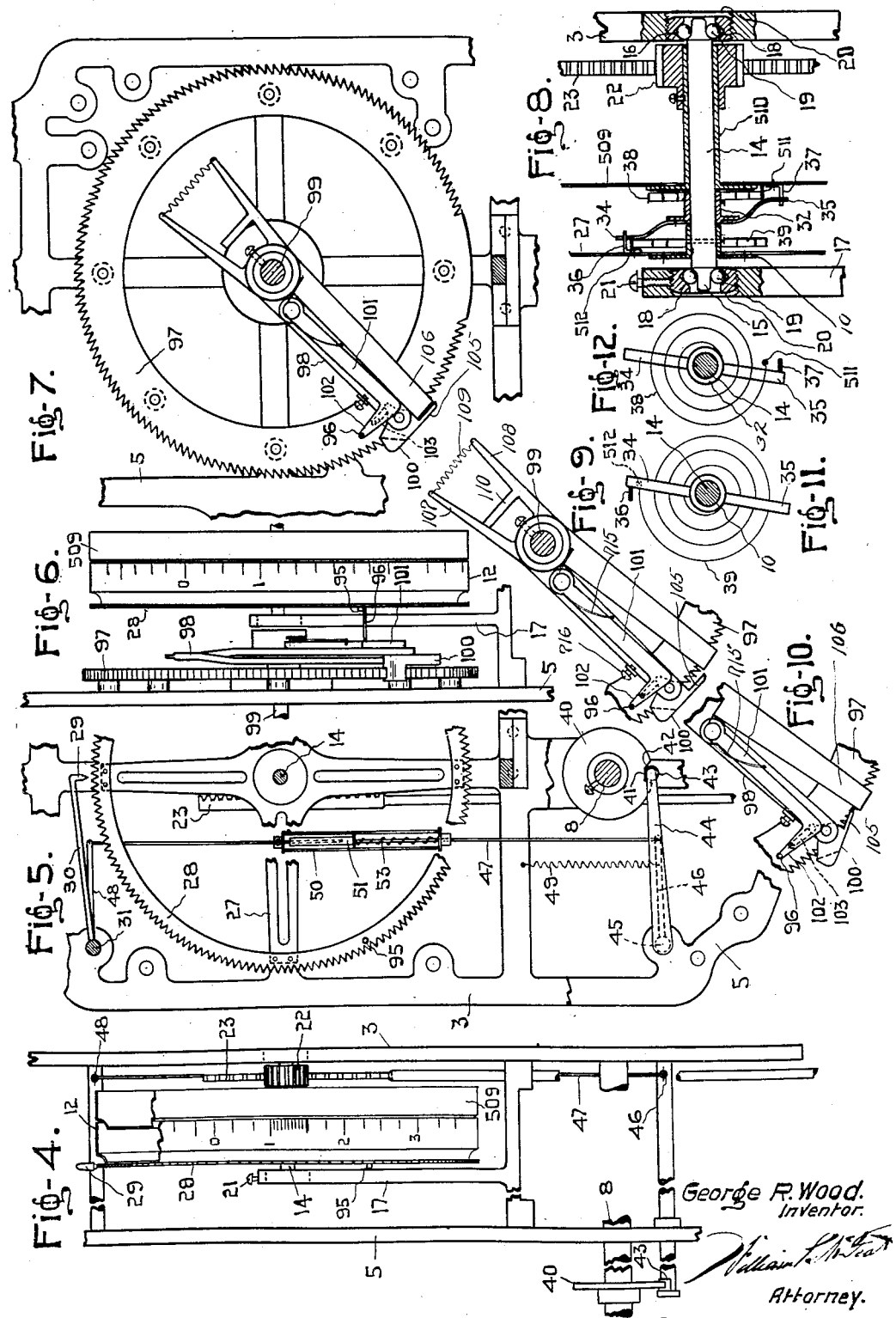

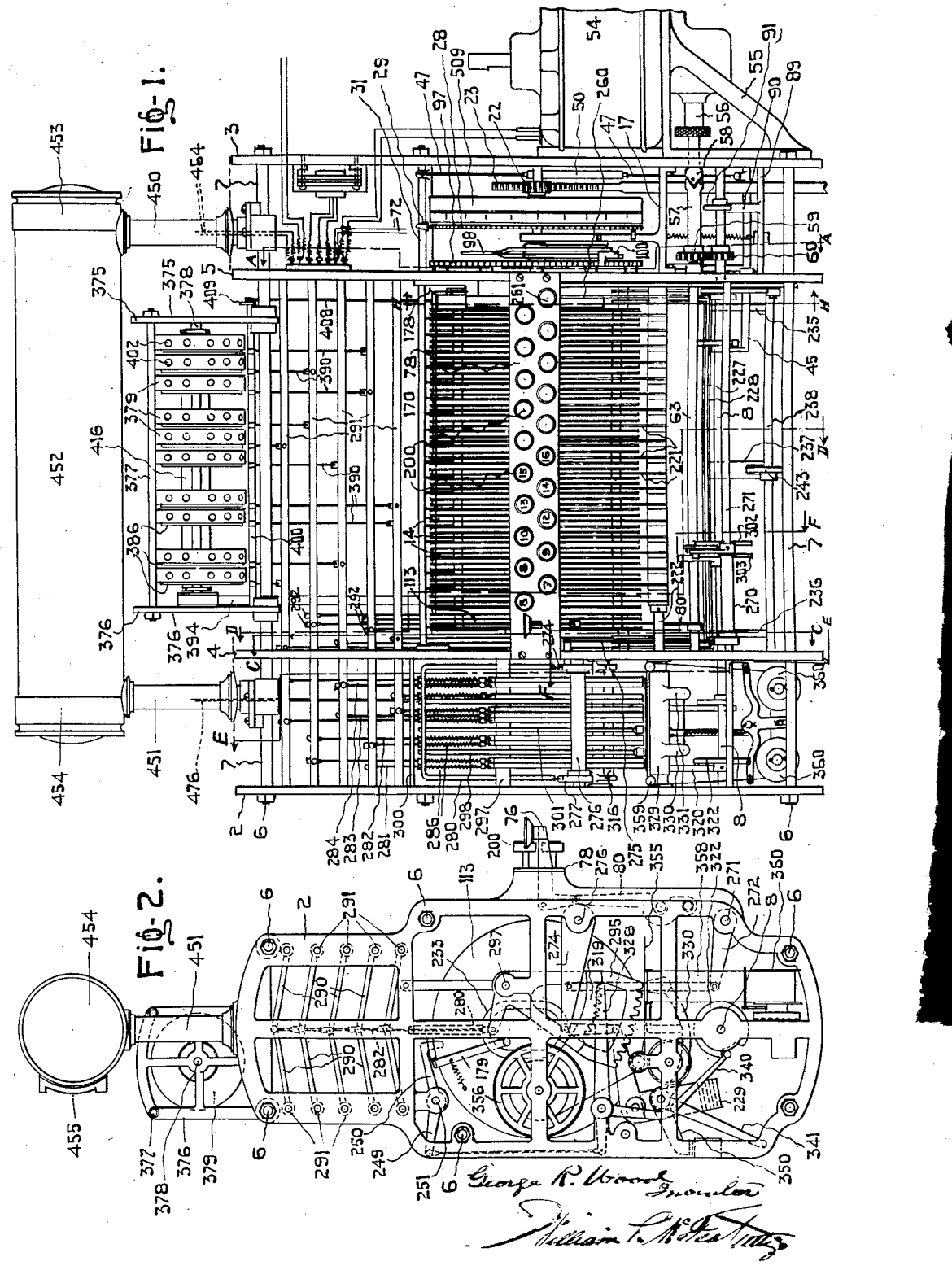

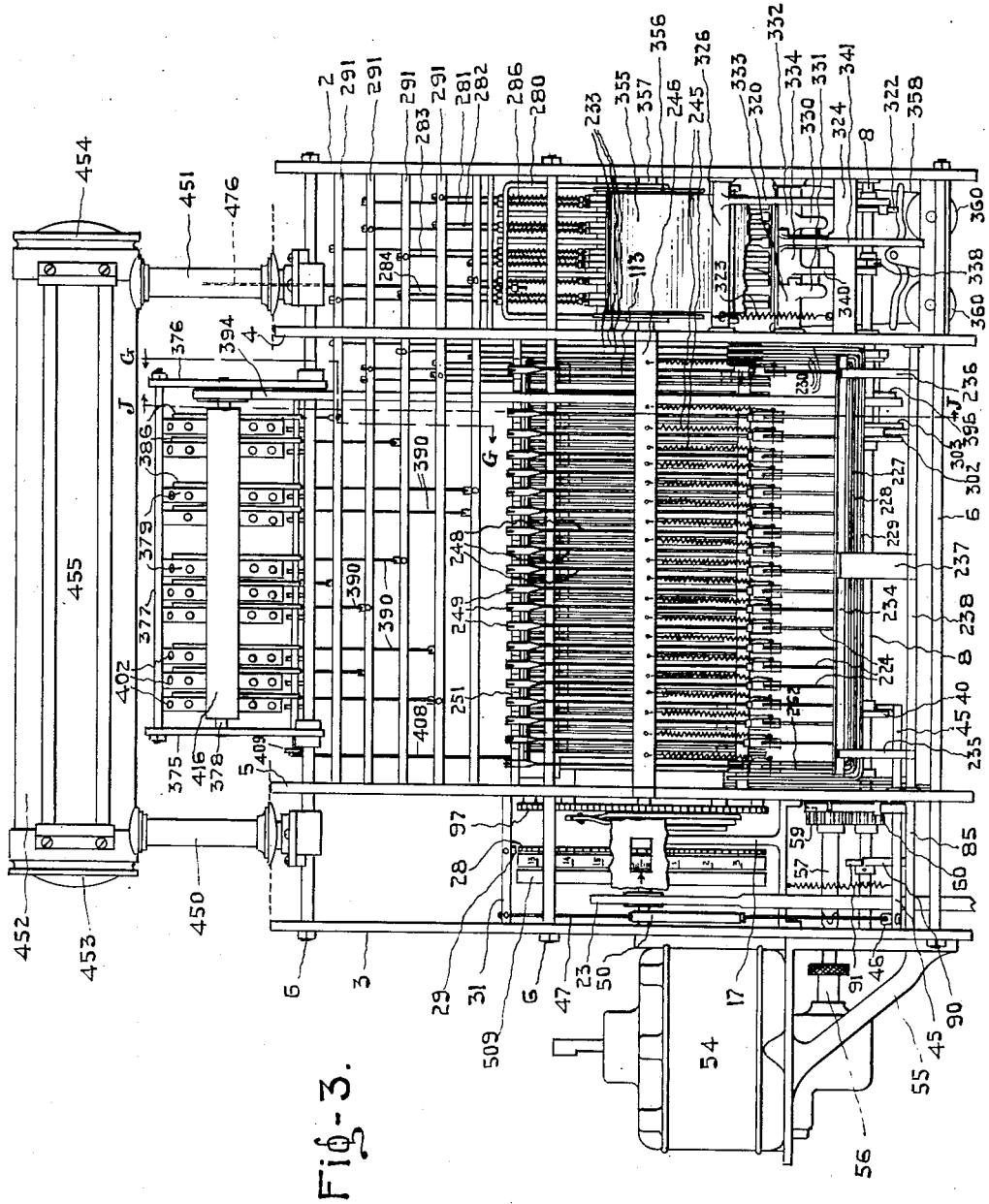

Feb. 17, 1925.
G. R. WOOD
COMPUTING MACHINE
Filed July 19, 1919
1,526,576
8 Sheets-Sheet 4
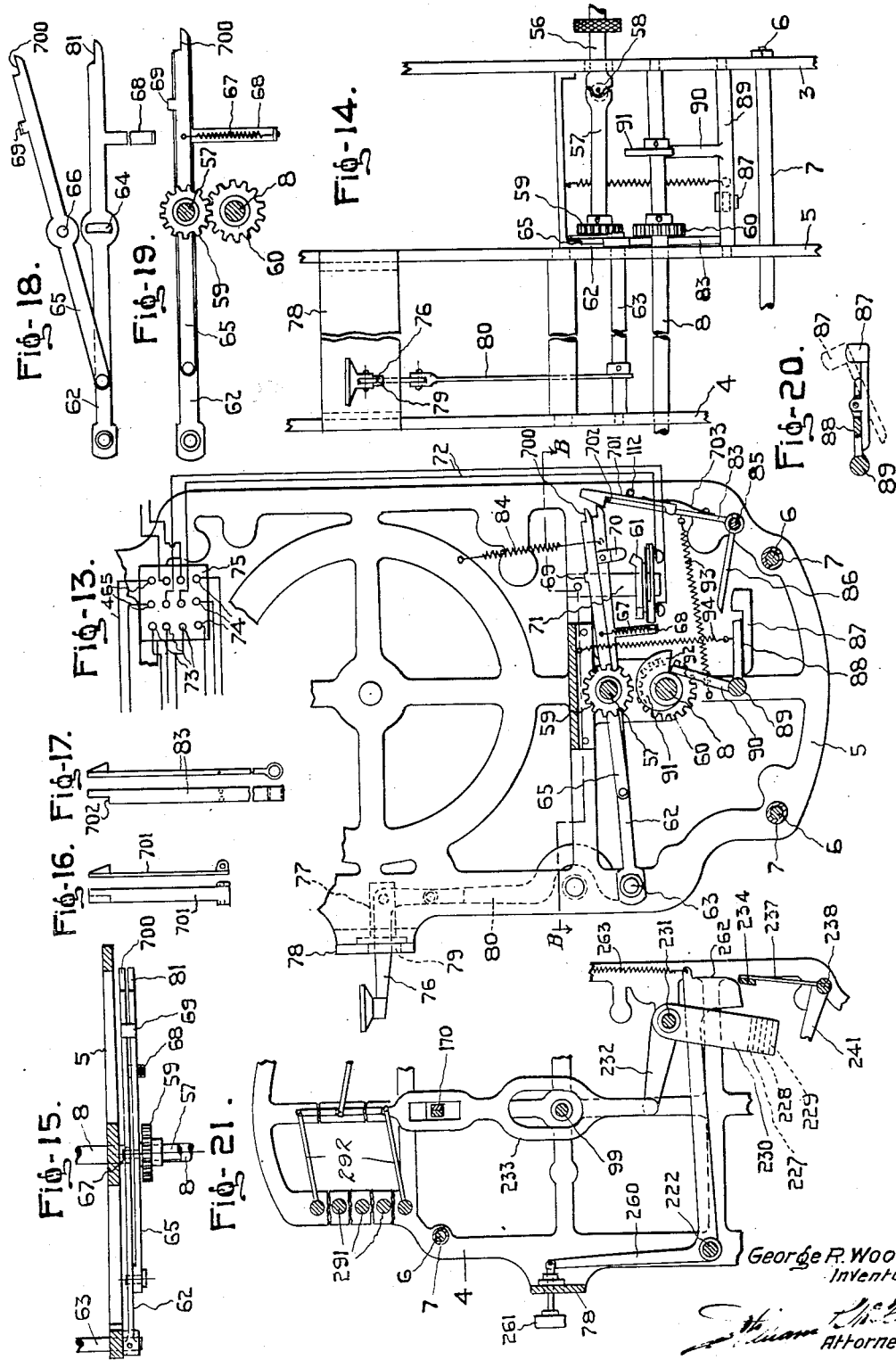
George R. Wood,
Inventor
Attorney.

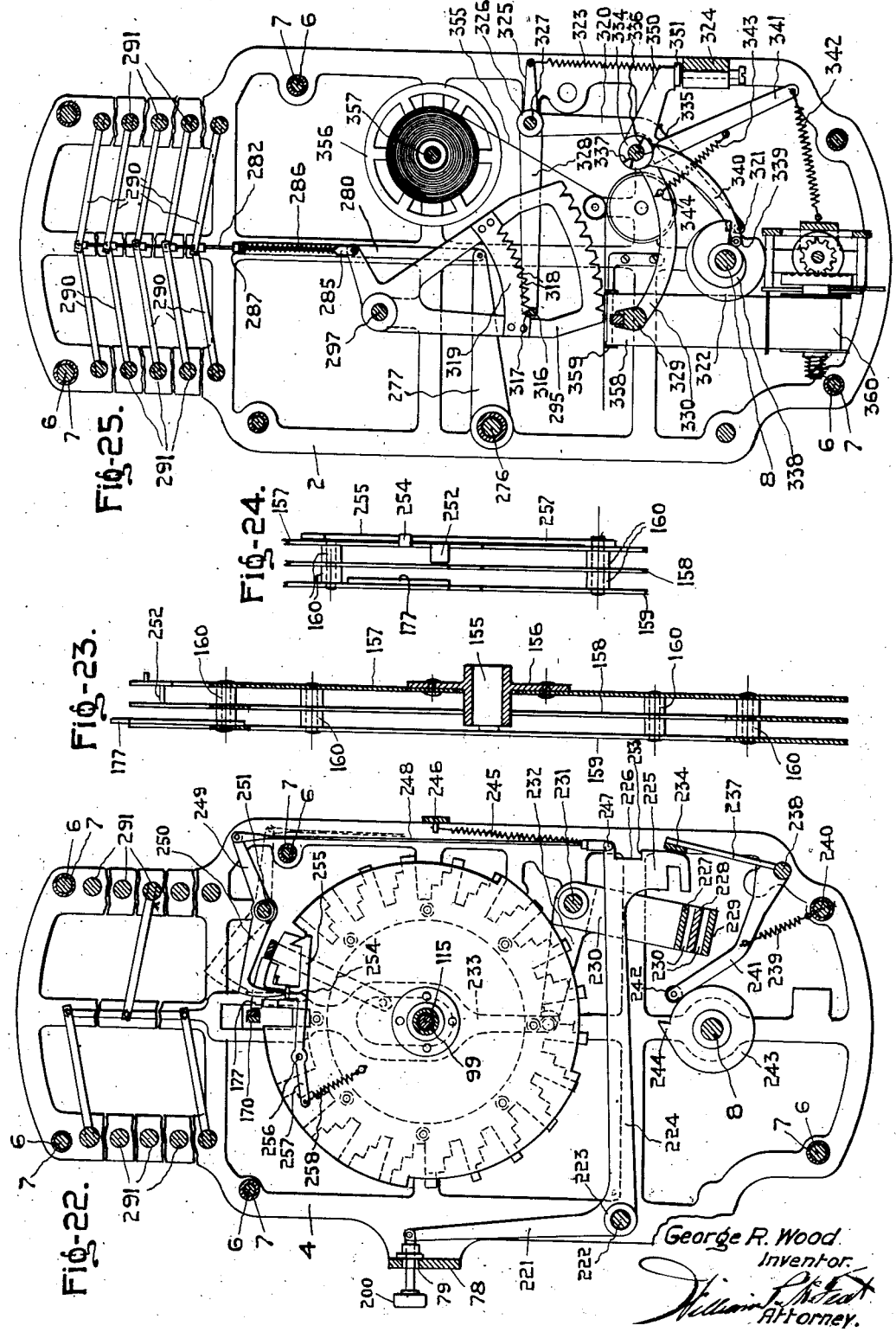

Feb. 17, 1925.
G. R. WOOD
1,526,576
COMPUTING MACHINE
Filed July 19, 1919         8 Sheets-Sheet 6
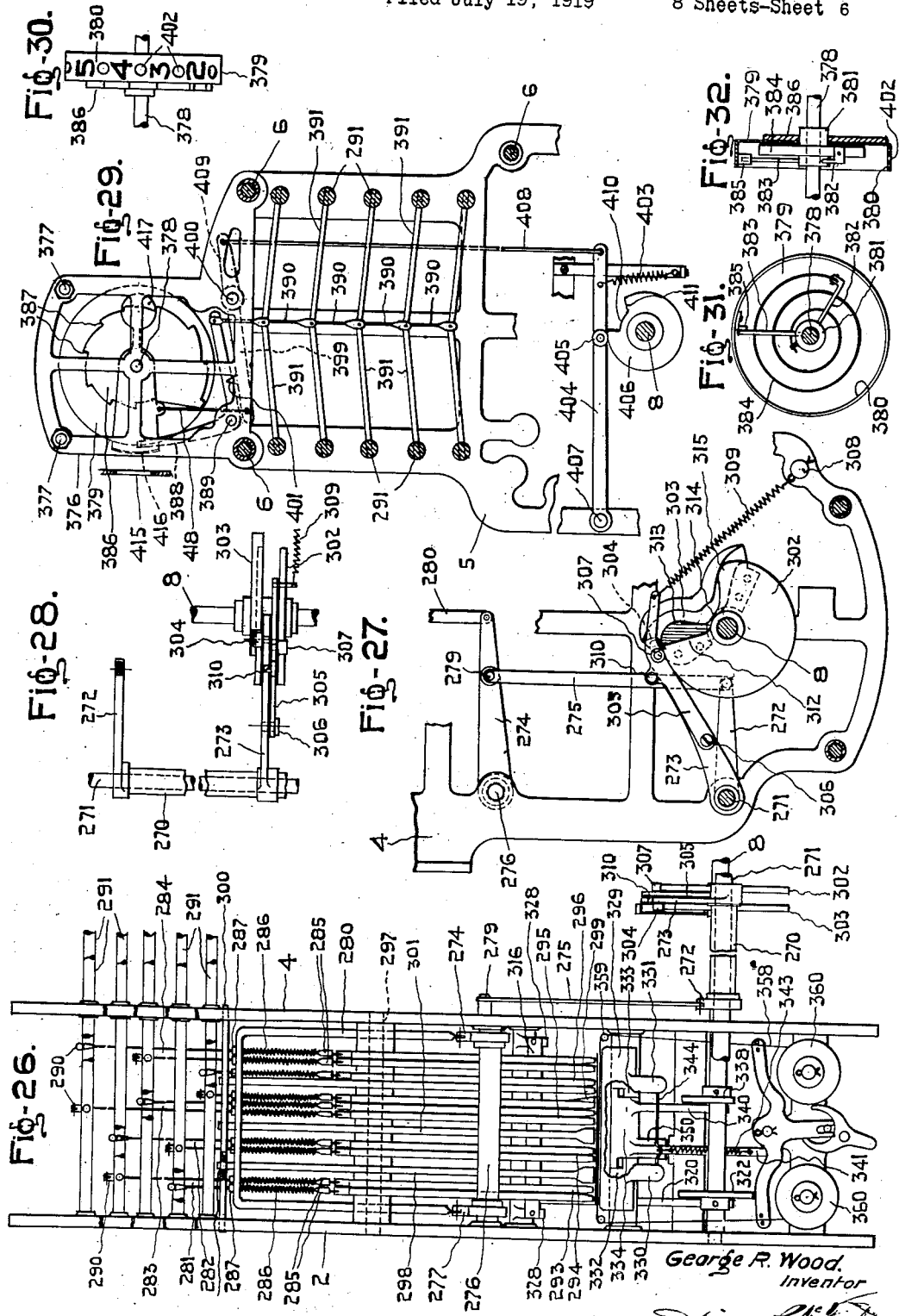
George R. Wood,
Inventor Feb. 17, 1925.
G. R. WOOD
COMPUTING MACHINE
Filed July 19, 1919  8 Sheets-Sheet 7
1,526,576
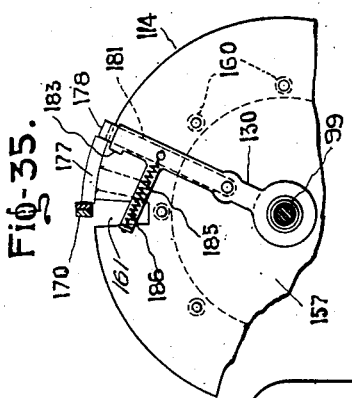
George R. Wood.
Inventor

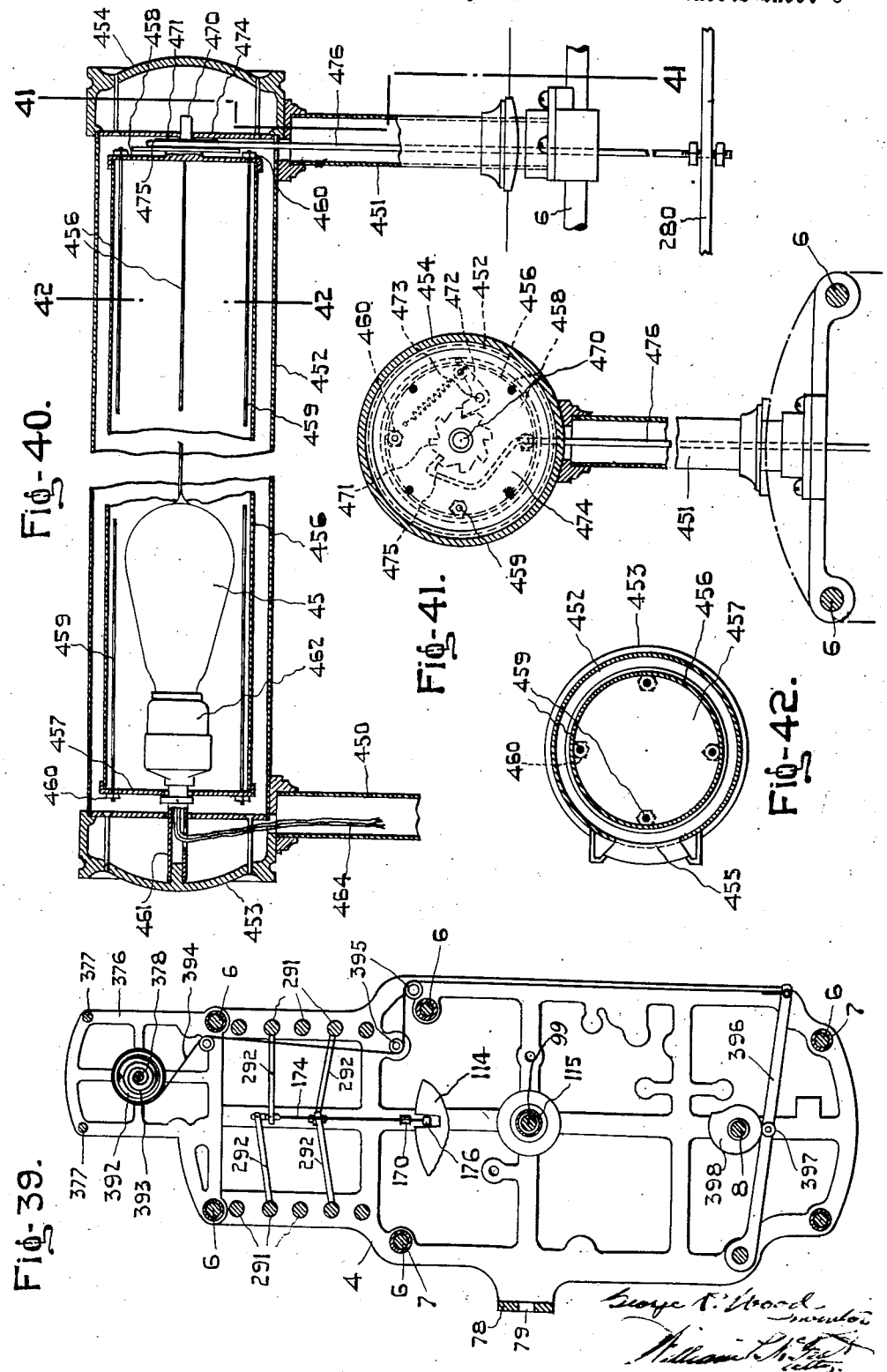

Patented Feb. 17, 1925.

1,526,576

UNITED STATES PATENT OFFICE.

GEORGE R. WOOD, OF MONTREAL, QUEBEC, CANADA, ASSIGNOR TO DAYTON SCALE COMPANY, OF DAYTON, OHIO, A CORPORATION OF NEW JERSEY.

COMPUTING MACHINE.

Application filed July 19, 1919. Serial No. 312,096.

*To all whom it may concern:*

Be it known that I, GEORGE R. WOOD, a subject of the King of Great Britain, and resident of the city of Montreal, Province of Quebec, Dominion of Canada, have invented certain new and useful Improvements in Computing Machines; and I do hereby declare that the following is a full, clear, and exact description thereof.

My invention relates to computing machines and more particularly computing scales of the type disclosed in my pending application Serial Number 209,551, and its object is to provide a machine in which the possibilities of inaccuracies occurring in the computations will be reduced to a minimum in which the various mechanisms will be relieved of stress and strain as far as is practical, and in which such mechanisms will so co-operate that with a comparatively simple construction and arrangement of parts a continuous computing operation may be obtained.

To this end my invention consists of the particular construction and arrangement of parts hereinafter described and pointed out in the claims.

For full comprehension, however, of my invention, reference must be had to the accompanying drawings in which similar reference characters indicate the same parts, and wherein:

Figure 1 is an elevation of the side of the machine towards the customer with the case removed;

Figure 2 is a similar view of the left end of the machine as viewed in Figure 1;

Figure 3 is an elevation of the side of the machine towards the merchant;

Figures 4, 5, 6, 7, 8, 9, 10, 11 and 12 are details of the controlling mechanism for determining the extent of movement of the computing wheels;

Fig. 13 is a detail sectional view taken on line A—A of Fig. 1 and looking in the direction of the arrows. This figure particularly illustrates the starting mechanism.

Fig. 14 is a front elevational view taken from the left of Fig. 13 and looking to the right.

Fig. 15 is a horizontal sectional view of the starting mechanism taken on line B—B of Fig. 13.

Figures 16, 17, 18 and 19 are detail illustrations of a locking means forming part of the starting mechanism;

Figure 20 is a detail view of a releasing hammer forming a part of the starting mechanism;

Fig. 21 is a detail sectional view illustrating a portion of the rate mechanism, the section being taken substantially on line C—C of Fig. 1.

Figure 22 is a transverse sectional view of the machine taken on line D—D of Fig. 1 and illustrating the rate mechanism and more particularly the rate wheels, their operating and locking instrumentalities and the rockers and other coacting parts;

Figures 23 and 24 illustrate in detail parts of the computing wheels;

Figure 25 is a transverse sectional view of the frame taken on line E—E of Fig. 1 illustrating the printing mechanism partly in elevation and partly in sectional view;

Figure 26 is a detail view of the mechanism at one end of the machine and including parts of the computing and printing mechanisms;

Fig. 27 is a detail view taken substantially on line F—F of Fig. 1 illustrating the cam and coacting levers of the computing and printing mechanisms.

Figure 28 is a detail view illustrating the mechanism of Figure 27 in plan view;

Figure 29 is a transverse sectional view on line G—G of Fig. 3 of the upper part of the machine and illustrating particularly the mechanism for the purpose of indicating to each purchaser the result of the computation in which he is concerned;

Figure 30 is a detail view of one of the indicator wheels;

Figures 31 and 32 are a detail side elevation and sectional view, respectively, of one of the indicator wheels.

Figure 33 is an axial sectional view, and Figure 34 is a side elevation on line H—H of Fig. 1, of a portion of the weight and price computing mechanism and parts of the means for causing the weight wheel and price computing wheels to rotate to computing position;

Figures 35, 36, 37 and 38 illustrate further details of the weight and price computing mechanism;

Figure 39 is a transverse sectional view of the machine taken on line J—J Fig. 3 and showing the computing mechanism and illustrating particularly the mechanism by which the indicating wheels are rotated;

Figures 40, 41 and 42 are, respectively, a longitudinal axial sectional view through the illuminated glass cylinder forming a part of the advertising mechanism in conjunction with the machine; a sectional view of this advertising mechanism taken on line 41—41 Figure 40; and a transverse sectional view taken on line 42—42 Figure 40.

In the embodiment illustrated my invention is shown applied to a computing scale although the various mechanisms are equally well adaptable to other kinds of computing machines of this type.

The machine frame comprises upright end sections 2 and 3 and intermediate sections 4 and 5 the sections being connected together by horizontal bars and spacing ferrules 7. The outside casing and the platform of the scale are not illustrated as they may be of any desired construction. The various mechanisms are actuated by a cam shaft 8 which is journalled in sections 2, 4 and 5 of the machine frame.

Controlling mechanism.

In the embodiment of my invention herein illustrated I have shown my invention applied to a computing scale in which one of the factors of the computation is based upon weight and the other factor is the price per pound of the commodity weighed. The apparatus is also adaptable for other computing purposes.

In weighing apparatus particularly, it is desirable that the weight set member be not positively locked. Otherwise excessive strains may be set up on the mechanism if weight is removed or added to the platform after the weight set parts are locked. Also the computation will be performed with an incorrect weight and an incorrect result will be secured. In order to minimize these difficulties I have provided two elements both of which are set in proportion to weight. Intermediate these elements is a yielding connection and locking means is provided to cooperate with one of the elements. The other element is therefore free to move under the influence of a change of weight and this element is so located as to disclose the movement thereof to the operator and the customer. A part of this mechanism namely the locked element or wheel is used as a controlling mechanism for the computation to be performed. This mechanism will now be described. The element to be locked comprises a comparatively light wheel having a rim 12 (Figs. 4 and 6) and provided with spokes 27 (Fig. 8) radiating from a suitable hub 10 which is rigidly carried by shaft 14. This shaft is free to rotate in the machine frame, and has its reduced ends 15 journalled in ball-bearings 16 one of the bearings being carried by the end frame 3 and the other by a vertical standard 17. Each of these bearings consists of a runway 18 in the form of an external screw-threaded disc containing anti-friction balls 19 and locking screws 20 and 21. The external screw-threads on the runway 18 permit of axial adjustment. A second wheel 509 essentially the same as wheel 12, has its hub 510 rotatable on shaft 14. Although wheel 509 may be rotated independently of wheel 12 both are adapted to rotate as one when the wheel 12 is not locked. The means by which this locking is effected will be hereinafter described. For computing quantities other than those to which the embodiment illustrated is adapted, this wheel 509 may be operated in any desired manner whereby it will have an extent of movement determined by the quantity computed. In the embodiment illustrated it is operatively connected to the platform of the scale by a pinion 22 rigidly mounted upon an axial extension of the hub 510 and it is in intermeshing relation with the teeth of a rack 23 such rack being operatively connected to the platform in any preferred manner to exert a downward pull upon the rack when an article is thrown upon the scale. This downward pull causes the wheels 509 and 12 to rotate until the graduation of weight representing the weight of the article upon the scale comes opposite an aperture in the side of the casing towards the merchant. At this point the wheel is adapted to be locked against further rotation. To this end a toothed annulus 28 is mounted rigidly on the wheel 12 and its diameter equals that of the wheel. A locking pawl 29 is adapted to be moved into engagement with the teeth of this annulus by means to be hereinafter described, the pawl being constituted by the downwardly bent free end of an overhanging arm 30 the opposite end of which is rigidly carried by a shaft 31.

As the controlling mechanism is of a very light construction it is necessary to provide means for reducing to a minimum the stress and strain exerted thereon when, for instance, a comparatively heavy weight is either removed from or added to the weight upon the platform while the toothed annulus is in locked position. Furthermore, it may be found desirable to commence a succeeding computing operation before the initial operation has been completed. To this end an intermediate connection between wheels 12 and 509 is provided which will permit rotation of the latter while the former is locked. This connection is effected by an intermediate flanged hub 32 mounted rotatably upon the shaft 14 between the hubs 10 and 510. This hub is provided with arms 34 and 35 extending from opposite sides thereof at right angles to the shaft 14, such hub being free to revolve on the shaft and its arms are adapted to be engaged by stops 36 and 37 carried by the respective wheels 12 and 509. A spiral spring 38 is connected at one end to the hub 32 and at its other end to a pin 511 on wheel 509. A second spiral spring 39 is connected at one end to hub 10 and at its opposite end to a pin 512 on arm 34. The purpose of the springs is to automatically take care of rotation of the wheel 509 in either direction while the annulus 28 is locked thus serving as a shock absorber and permitting the commencement of a succeeding operation before initial operation has been completed. If, for instance, a five pound weight is placed upon the scale while a computing operation is taking place a downward thrust of five pounds will be exerted upon the pinion 22 by the rack 23 this thrust will be taken up by the spring 39 as the stop 37 will engage the pin 35 and rotate it in a clock-wise direction looking from the adjacent end of the machine frame this action obviously winding up the spring. If, in another instance, the locking pawl is in locking position and a weight is taken off the platform of the scale, the upward push of the rack 23 will rotate wheel 509 and wind up spring 38 as stop 36 prevents rotation of the hub 32.

When the wheel 12 has come to weight-indicating position and the starting key depressed the pawl 29 is adapted to move automatically into contact with the teeth of the annulus 28 and lock the same against further rotation. This actuation of the pawl is effected by a cam 40 (Fig. 5) rigidly mounted upon the shaft 8 and having an abrupt drop 41 and a rise 42 the remainder of the cam being of uniform diameter. Bearing against the perimeter of this cam is a roller 43 rotatably mounted upon the free end of an arm 44 the opposite end of which is rigidly secured to a shaft 45 journalled in the machine frame near the bottom thereof and which also rigidly carries a second arm 46 extending parallel to the first mentioned arm and having its free end connected to the lower end of a pull rod 47. The upper end of this pull rod is pivotally connected to the free end of an arm 48 extending parallel to the arm 30 and rigidly carried by the shaft 31 located near the top of the machine frame. A helical spring 49 having its opposite ends connected respectively to the machine frame and the free end of arm 46 normally maintains the roller 43 in bearing relation with the periphery of the cam 40 and the pawl 29 out of engagement with its toothed annulus.

As the extent of movement of the pawl 29 relatively to the toothed annulus is limited, it is necessary to provide resilient means in the operative connection between it and its actuating cam to take up any surplus throw of the latter. To this end the pull rod is constructed in two parts the upper part having a yoke 50 rigidly connected thereto, the lower part of the pull rod extending upwardly through the yoke and being connected to a sleeve 51 the upper end of which slidably receives the lower end of the upper part. A helical spring 53 encircling the lower part of the pull rod and bearing between the sleeve and the lower end of the yoke is adapted to maintain the parts in their normal relative positions.

When the pawl 29 is out of locking position the roller 43 is located within the drop 41 on the cam but almost immediately the cam commences rotation the roller moves up incline 42 thereby pulling the pawl into engagement with the teeth of the annulus and the pawl is held in this position for approximately one revolution of the cam.

Before describing in detail the various computing mechanisms I shall explain the starting mechanism for setting the computing mechanisms in motion.

*Starting mechanism.*

The starting power is preferably derived from a motor 54 (Fig. 1) which is mounted upon a bracket 55 rigidly secured to the end 3 of the machine frame. It is to be understood, however, that a crank arm or other manually operated means may be employed for setting the machine in motion without departing from the spirit of my invention. The motor drives a shaft divided into two parts, a rigid part 56 and a laterally movable part 57 the parts being connected by a universal joint 58. Rigidly mounted upon the inner end of the part 57 relatively to the machine frame is a gear 59 adapted to intermesh with a gear 60 rigidly mounted upon the cam shaft.

In order to simultaneously move the gears 59 and 60 into intermeshing relation when the switch 61 of the motor is closed, one end of a carrying arm 62 (Figs. 13–18) is rigidly mounted on the adjacent end of a shaft 63 extending across the front of the machine frame. This carrying arm is provided with an enlargement approximately midway its length containing a substantially vertical slot 64. One end of a lever 65 is pivotally mounted on this arm and has a circular hole 66 adapted to register with the slot 64. This hole 66 constitutes a bearing for the reduced end 67 of the adjacent shaft part 57, such reduced end projecting into the slot 64 and thereby allowing a limited relative movement between the carrying arm and the lever 65. The object of this arrangement is to prevent mutilation of the gears when the switch is closed and the former are not in proper intermeshing relation. A spring 67 (Figs. 13 and 19) having its ends connected respectively to the lever 65 and a downwardly projecting arm 68 formed integrally with the carrying arm 62 is adapted to resist relative separation of the carrying arm and the lever while a lug 69 on the lever limits movement of the latter relatively to the arm. The free end of lever 65 is correspondingly cut away as at 700 for engagement with a pawl 701 pivoted at its lower end upon the back of the main pawl 83, the latter being cut away as 702 to accommodate the same. A spring 703 mounted on the main pawl yieldingly resists relative separation of the pawls. When the switch is closed if the gears 59 and 60 are in proper intermeshing positions the two pawls will lock arm 62 and lever 65 simultaneously but if not in proper intermeshing positions the auxiliary pawl will not act until such gears are moved into relative intermeshing relation. The arm 62 at a point adjacent to its free end carries the blade 70 of the switch 61 the latter being rigidly mounted on an angular bracket 71 rigidly secured to the machine frame. The terminals of this switch are included in an electric circuit 72 which also includes the terminals 73 of the rheostat and the terminals 74 of the motor the latter being carried by a block 75 secured to the machine frame near the top thereof. The switch is closed and the gears moved into intermeshing relation with each other by a manually operated starting key 76, one arm of a bell crank lever pivotally mounted in a bracket 77 on a horizontal face plate 78 extending across the front of the machine frame such plate having a plurality of vertical slots 79 through one of which the key 76 projects. The other arm of the bell crank lever is operatively connected to the forked upper end of an arm 80 which is rigidly mounted upon the shaft 63 in close proximity to the section 4 of the machine frame so that when the key is depressed such shaft is rotated and the carrier arm 62 with gear 59 and blade 70 is swung down until they are in their operative positions. A tendency of the arm 62 to move upwardly is imparted to it by a spring 84 which is connected to it and to an adjacent part of the machine frame. Rearward movement of the pawls 83 and 701 is limited by a rigid pin 112 projecting from the machine frame. In order to automatically release the arm 62 and lever 65 after the various computing mechanisms have performed their respective functions and the computations have been completed, means is provided for moving the pawls 83 and 701 out of engagement with the arm 62 and lever 65. To this end the pawls are carried by a shaft 85 such shaft also having a comparatively short second arm 86 (Fig. 13) projecting horizontally therefrom and in operative relation with a releasing hammer 87, such hammer in close proximity to the end of its handle being pivotally connected to the middle of an arm 88 carried by a shaft 89. This shaft also has a second arm 90 rigidly mounted upon it and in bearing relation with the perimeter of cam 91 mounted on the shaft 8 such cam having a drop 92 which is timed to cause the hammer to engage the arm 86 when the switch is to be opened. A spring 93 maintains the pawls in proper operative relation to the free ends of the arm 62 and lever 65 while a second spring 94 connecting the arm 88 to the machine frame maintains the arm 90 in bearing relation with its cam. It will be noted that the hammer 87 is only in contact with the arm 86 when striking, the pivotal connection of it to the arm 88 permitting it to swing up by its own impetus into engagement with the arm 86. This prevents any interference with the locking action of the lever 83.

After the wheel 12 is positioned and locked a stop pin 95 (Fig. 6) carried by the annulus 28 which is fixed to the wheel is utilized to limit the movement of a certain series of parts which may be called differential controlling devices. These differential controlling devices are moved by an independent source of power to a position to be limited by the aforesaid pin. When the parts cooperate with the pin they contact therewith so lightly and in such a manner as not to tend to displace the locked wheel from its previously set position. Furthermore the differential controlling devices which in turn control the extent of movement of certain of the computing devices are in themselves locked upon cooperation with the limiting pin whereby the position of the parts is definitely determined and possible overthrow thereof is prevented.

Power to drive the differential controlling devices is derived from a spring 190 (see Fig. 33) (to be hereafter described). This spring power tends to rotate shaft 99 and rotation of this shaft commences as soon as a cam 216 moves away from a follower 215 (see Fig. 34). The follower and cam is arranged to restore power in the spring at the proper time in the cycle of the machine. These features will be hereafter described.

The differential controlling devices are shown in Figs. 6, 7, 9 and 10. In Figs. 7 and 9 the shaft 99 is the shaft which is impelled to rotate in a clockwise direction by the spring previously mentioned. Fixed to a part carried by the end of shaft 99 is a lever 106. This lever is extended beyond the shaft at 108. A second arm 98 is freely rotatable about shaft 99 and has an extended end 107 beyond the shaft. Extended portions 107 and 108 are connected by a spring 109 and the extent of approach of the portions 107 and 108 is limited by a strut 110 carried by 108. Pivoted upon a stud carried by arm 98 is a lever 101 and the free end of this lever is extended at right angles to its length at 102 and carries a laterally extending stop 96 in the form of a pin. Carried by the end of arm 98 is a pivoted pawl 100. This pawl is of substantially L form, the toe portion overlying a toothed annulus 97 which is fixed to the frame of the machine (see Fig. 6). The shank of this pawl is extended to form a tail 105 which lies in the path of the end of lever 106. The pawl 100 is normally maintained out of engagement with the toothed annulus by means of a link 103 which connects the pawl with the portion 102 of lever 101. Lever 101 is normally urged forward relatively to carrying arm 98 by a blade spring 715 thereby holding the pawl out of engagement with the annulus 97. The distance which the pawl is held out of engagement is determined by an adjusting screw 716 which is carried by the arm 98 and extends in the path of lever 101.

The operation of the differential controlling devices is as follows. The energy of the spring 190 which may be termed a motor spring reacts to impart clockwise rotation to shaft 99. Lever 106 is concurrently rotated clockwise and arm 98, parts 101, 102 and 96 swing in unison with the lever 105. Arm 98 is in advance of lever 106 (see Fig. 10). The advance is caused by the tension of spring 109 and the amount thereof is limited by stop 110. Arm 101 is also in advance of arm 98 and in contact with stop 716. The path of pin 96 coincides with the path of pin 95 and upon contact therewith parts 102, 101 will be displaced rearwardly relative to arm 98 thereby rocking pawl 100 into engagement with fixed annulus 97 and stopping further forward movement of arm 98 (see Fig. 9). Lever 106 continues to rotate extending spring 109. This supplementary rotation of lever 106 swings the end of the same under the tail 105 of pawl 100 (see Fig. 7), thereby locking the pawl into engagement with the toothed annulus and preventing any rebounding after being swung into engagement therewith. The part 106 is now arrested. The computing member or members which rotate in unison with the shaft are also arrested and these parts are so timed as to take into account the slight angular travel which occurs between the initial engaging of pawl 100 and the final arrest of arm 106.

*Weight and price computing mechanism.*

The members proper for computing weight and price consist of a plurality of wheels. In the embodiment illustrated there is one weight wheel 113 and nineteen price wheels 114. In machines of this type it is most important that friction be reduced to a minimum in order that comparatively light parts may be employed and that accurate computations be secured. To this end I have mounted the wheels upon a floating axle. This axle is carried by the shaft 99 (see Fig. 33) and consists of a sleeve 115 the opposite ends of which project into cuplike bearings 116 and 117 respectively, the bearing 116 being constituted by the hub of the weight computing wheel provided with a chamber 118 into which the adjacent end of the sleeve projects and between the walls of which and a circumferential concavity 119 on the sleeve are antifriction balls 120. The hub 116 is provided with an axial projection 121 of smaller diameter which projects into a bearing of cup-like form 122 rigidly secured to the adjacent section 4 of the machine frame and containing antifriction balls 123. The extension of the hub is keyed to the shaft as at 124. The bearing 117 at the other end of the sleeve is of similar construction and consists of cup-like member 125 rigidly mounted in a drum 191 and containing antifriction balls 126 bearing between it and the adjacent end of the sleeve, the drum 191 being keyed to the shaft 99 as at 127. The drum 191 is provided with an axial exension 128 of comparatively small diameter upon which is rigidly mounted a gear 129 and an arm 130. This axial extension 128 is located adjacent to section 5 of the machine frame having a comparatively large opening 131 thru which the shaft 99 projects. On the opposite side of the section 5 is rigidly fastened another cup-like member 132 the inner wall of which is screw-threaded as at 133 to receive an adjusting disc 134 one side of which constitutes one side of a runway for antifriction balls 135 bearing between it and a circumferential flange 136 formed integrally with a collar 137 rigidly keyed to the shaft 99 as at 138. The disc 134 makes possible the adjustment of the various bearings as through it the shaft 99 may be shifted axially.

With the exception of the weight computing wheel all of the wheels present three computing circumferences each circumference corresponding to a denominational order; the weight wheel, however, presents four. This latter wheel consists of two spaced discs 150 and 151 rigidly secured to opposite sides of the hub 116 these discs in turn rigidly carrying two intermediate rings 152 and 153 and the circumferences of both discs and rings are notched throughout, the depths of the notches being in proportion to each other, a predetermined depth representing so many units of value. The depths of the notches in the disc 151 represent units of ounces and those of rings 152 and 153 and disc 150, tens of ounces, units of pounds and tens of pounds, respectively. The rings and discs are spaced apart by ferrules 154.

The price computing wheels (Fig. 23) are of the same diameter as the weight wheel and each consists of a hub 155 having a circumferential flange 156 upon which is rigidly mounted a disc 157. This disc rigidly carries two rings 158 and 159 spaced apart by thimbles 160 and the circumferences of the three are notched in a similar manner to the weight wheel. The hub 155 is adapted to rotate on the floating axle 115.

For a proper understanding of the mechanism now to be described the cycle of operation of the computing and weight wheels must be here described. The amounts are taken off from the wheels by a series of pins. There are a group of pins for each computing wheel and a group for the weight wheel. Each pin group comprises a plurality of pins, there being one pin for each denomination order. All groups of pins operate in unison and with no load upon the scale and with computing wheels and weight wheel in normal home position all the groups of pins would align with deep notches 161 in these wheels and the pins could all be depressed without being arrested by contact with the wheels. In the normal operation of the machine all the computing wheels are first at home position and are all locked in this position. The depression of a rate key selects and unlocks a particular computing wheel. Thereafter upon movement of the differential controlling devices, this previously selected wheel is locked to a part which operates in unison with the differential controlling device. The selected computing wheel and the weight wheel which always operates in unison with any selected rate wheel are displaced angularly in accordance with the movement of the different devices. The pins are then depressed and a reading is taken from the selected computing wheel and the weight wheels. The other pin groups are depressed in unison with the group of pins which are being arrested by the selected computing wheel and rate wheel but these pin groups are ineffective as they pass idly down in the notches 161 previously mentioned.

A guide bar 170 of rectangular cross-section (Figs. 39, 37 and Fig. 22) is carried by the machine frame in the vertical axial planes of the computing wheels and immediately above the same the ends of the bar being seated in brackets 171 and 172 the end resting in the latter bracket being removable and held in position by a pin 173. This bar is divided vertically and longitudinally into two parts and is bored to permit of the passage therethrough of pins 174 having their extreme lower ends of increased width and constructed and arranged to cooperate with the notched peripheries of the computing wheels in effecting the computations. The lower half of each of the borings 175 is increased in diameter as at 176 to enable the pins to be drawn up within the bar when out of computing position. Means for carrying the pins will be referred to presently.

In order to align all of the computing wheels in one position when idle, each wheel is provided with a radial projection 177 one radial edge of which is adapted to bear against the guide bar 170, the other edge being engaged by a bar 178 of substantially U-form and straddling the series of computing wheels. This bar yieldingly engages the projections 177 and aligns them against the guide bar when the wheels are idle. One arm 179 of this U-bar is pivotally mounted as at 180 upon the disc 150 of the weight computing wheel the other arm 181 being pivotally carried by the arm 130, hereinbefore mentioned. The free end of the latter is provided with a laterally projecting lug 183 adapted to engage the U-bar and prevent relative movement between it and the arm 130 in one direction. Relative movement in the opposite direction is resiliently resisted by a spring 186 having its ends respectively connected to the U-bar and the free end of an arm 185 formed integrally with the arm 130. A spring 187 performing a similar function connects the other arm of the U-bar to the disc 150. The object in pivotally mounting the U-bar upon the arm 130 and disc 150 instead of directly to the shaft 99 is to permit the U-bar to take care of any surplus rotation which may be imparted to the shaft 99 by the means for returning the wheels to their initial positions. This means is hereinafter described.

The means for causing the weight wheel and the price computing wheel, the notches in which represent multiples of the rate entering into the computation, to rotate to computing position, consists of a spiral clock spring 190 which is wound upon the drum 191 in a counter-clockwise direction looking towards the machine frame and contained in a box 720. The ends of this spring are respectively connected to a hook 192 on the drum 191 and to the circumference wall of the box. The torque of the spring 190 is constantly exerted upon the drum 191 and the weight computing wheel and U-bar, but not on the price computing wheels as the latter are freely mounted upon the floating axle 115 under the control of the U-bar, and a locking and releasing device constituting a part of the rate computing mechanism to be hereinafter described releases but one of the price computing wheels for each computation.

When the computing members have performed their computing functions the U-bar automatically returns them to their initial positions. The means for causing this action of the U-bar consists of a rack in intermeshing relation with the gear 129 and extending therebetween and a roller 211 mounted on the adjacent portion of the machine frame. One end of this rack is pivotally mounted in the forked upper end of one arm of a bell crank lever 212 which in turn is carried by a stub shaft 213, the free end of the other arm of the bell crank, 214, carrying a roller 215 in bearing relation with the circumference of a cam 216 and keyed to the shaft 8. In returning the computing wheels to their initial positions the cam 216 is adapted to move the bell crank arm 214 downwardly the rack being thereby shifted towards the rear of the machine frame. The cam locks the U-bar in juxtaposition with the guide bar 170 until the next computing operation thereby holding the computing wheels in home position. (See Fig. 35.)

*Rate mechanism.*

The rate computing mechanisms are in intimate co-operation with the weight and price computing mechanisms as each controls a locking device for the U-bar. There are a plurality of rate buttons 200 (Figs. 13 and 22) the shanks of which extend through slots in the face plate 78. These buttons are preferably arranged in two series the series being relatively staggered and each button is adapted to actuate a mechanism independently of the others a series of rockers however being common to all. I will therefore only describe one of these rate computing mechanisms as the description of one applies equally well to the others.

Each button 200 is operatively connected to the substantially vertical arm 221 of a bell crank lever mounted upon a shaft 222 the levers of the respective rate mechanisms being spaced apart by collars 223, and the horizontal arm 224 of the bell crank extends to the rear of the machine between the shaft 8 and the computing wheels and each lever is located immediately beneath its respective price computing wheel. This horizontal arm 224 is of substantially L-form, the toe of the L being comparatively wide as at 225 and notched as at 226 to permit of varying extents of movement of preferably three nested rockers 227, 228 and 229 the rockers extending horizontally beneath the arm 224 and being suspended by vertical arms 230 from a shaft 231. An arm 232 is rigidly fastened to each of the arms 230 thus obtaining a bell-crank action which converts the downward push of link 233 to which the arms 232 are operatively connected into an oscillatory movement of the rockers. When each of the arms 224 is not in computing position it is located above the path of the rockers but when one of the rate buttons is pressed the arm is swung down until its toe intersects such path and causes the printing and indicating mechanisms, to be hereinafter described, to be actuated in proportion to the extent of movement of the rockers within the notches. The arm 224 is locked in its computing position by a locking bar 234 mounted upon the upper ends of three arms 235, 236 and 237 the latter being comparatively wide. These arms are rigidly carried by a shaft 238. The locking bar extends throughout the series of rate computing arms 224, is common to all and is adapted to engage a shoulder 253 constituted by a notch on the rear end of each of such arms. A spring 239 having its ends connected to a bar 240 and an arm 241 imparts to the locking bar a tendency to engage the shoulder 253 when one of the computing levers is actuated, the arm 241 extending at substantially right angles to the arm 237 and being rigidly connected thereto while its free end carries a roller 242 constructed and arranged to bear upon the circumference of a cam 243 of substantially uniform diameter throughout and having a radial projection 244 constituting a short rise and fall such projections disengaging the rate lever from the bar 234 when the computation has been completed. A spring 245 having its ends connected to a bar 246 across the back of the machine frame and a cotter pin 247 causes the lever 224 to return to its initial position out of the path of the rockers when it is released. The cotter pin 247 pivotally connects the lower end of a pull rod 248 to each of the rate computing levers and the upper end of this pull rod is in turn forked and pivotally connected to the tail 249 of a locking pawl 250 which is rotatably mounted on a shaft 251 and adapted to lock the respective price computing wheel of the rate lever to which it is connected.

It will be understood that there is one pawl 250 for each computing wheel. Each pawl when in locking position (i. e. full line position in Fig. 22) swings down behind a lug 252 on its price computing wheel. This lug is turned in from the periphery of the wheel and is shown in Fig. 24. With the parts in full line position as shown in Fig. 22 there is a double lock for the computing wheels. Lug 177 on the wheels contacting with bar 170 prevents counter clockwise rotation thereof. This same lug being in contact with U bar 254 prevents any clockwise rotation thereof. As soon as the U bar moves away this latter lock would be removed and therefore use is made of the third lock comprising pawl 250 and lug 252 to lock all of the wheels except the one which is to be selectively operated in unison with the U bar. While preventing rotation of the computing wheel the pawl also bears down upon an angular bent flange 254 formed integrally with a second pawl 255, the pawl being pivotally mounted on the side of the computing wheel as at 256 and having a tail 257. This pawl is constructed and arranged to swing radially a sufficient distance to intersect the path of the U-bar when the pawl 250 is released, such radial movement being imparted to it by a spring 258 having its opposite ends connected respectively to the computing wheel and tail 257.

In the operation of this mechanism when one of the rate buttons is pushed in, pull is exerted upon the rod 248 and the pawl 250 is swung out of engagement with the flange on the pawl 255 thereby permitting the latter to intercept the U-bar and simultaneously release the computing wheel upon which such pawl is mounted so that only the respective computing wheel of the rate mechanism actuated is rotated. The pawl 255 of the selected wheel swings up behind the U bar 254 and rigidly couples the wheel to the bar. The selected wheel it will be understood rotates clockwise as viewed in Fig. 22 and will be held to the U bar by the conjoint action of lug 177 and pawl 255 which engage the U bar at opposite sides thereof.

In order to provide means for returning the rate lever the button of which has been inadvertently pushed, a bell crank lever 260 (Fig. 21) of a contour similar to that of the rate levers is mounted upon the shaft 222 at the right of the series of rate levers and its substantially vertical arm is operatively connected to a release button 261. The difference between this release lever and the other levers is that it is not notched and presents a convex edge 262 projecting rearwardly of the other levers whereby when the release button is pushed in such convex portion engages the locking bar 234 and shifts it to the rear disengaging it from the shoulder 253 of the rate lever which has been inadvertently operated. An upward pull is exerted upon this rate lever by a spring 263 fastened to the bar 246. If for instance a certain rate button has been pushed in and the operator desires to change the rate, he may do so by pressing in the desired rate button as this action automatically displaces the locking bar 234 from the rate lever of the rate mechanism first operated, the bar being displaced by the convex edge 264 on the end 225 of each rate lever. It is optional whether the operator changes the rate by releasing the button inadvertently pressed through the release mechanism or the desired rate mechanism, but if it is found that no computing operation is necessary after a button has been pushed in, only the release mechanism would be employed because if one rate button is released by another the second in its turn will be locked.

There is a combined means for moving the pins 174 into engagement with the circumferences of their respective computing wheels and for moving the rate rockers 227, 228 and 229 into engagement with the rate computing bell crank lever which has been operated. This means also indirectly actuates the type printing mechanism, to be presently described, the extent of movement of the type being controlled by the computing pins and rockers respectively. This combined means consists of a sleeve 270 Figs. 26 and 27 freely mounted upon a shaft 271 and carrying rigidly upon its opposite ends laterally projecting arms 272 and 273 the free end of arm 273 being in operative relation with a cam which will be hereinafter described. The free end of the other arm is pivotally connected to an arm 274 by a substantially vertical link 275 the arm 274 being rigidly mounted upon one end of a shaft 276 which shaft has a corresponding arm 277 on its opposite end. The pivotal connection of the link 275 to the arm 274 is located substantially midway the length of the latter as at 279 and the free end of such arm and arm 277 are in turn pivotally connected to a vertical reciprocatory yoke 280 of inverted U-form. The horizontal portion of this yoke has a plurality of holes bored therein to permit the free passage therethrough of four groups of pull-rods 281, 282, 283 and 284. The lower ends of these rods are of increased diameter to present enlargements 285 to prevent the displacement of springs 286 encircling the pull rods and bearing between such enlargements and the underside of the yoke, the upper side of the latter bearing against collars 287 rigidly carried by the pull rods. The upper ends of the pull rods are operatively connected to the arms 290 rigidly carried by two vertically aligned and spaced series of rock shafts 291, the arms carried by each series extending towards the other series and the oscillatory action exerted upon these shafts by downward movement of the pull rods 281 is transferred to the push rods 233 and the computing pins 174 by arms 292 pivotally connected to the same (see Figs. 21 and 39). It will be observed in Fig. 22 that there are ten of these rock shafts 291. Three of these shafts are utilized for recording and indicating the rate, one shaft being employed for each denominational order thereof. Four of the shafts are similarly used for weight there being one shaft for each denominational order thereof or two for pounds and two for ounces. For the product or price three shafts are utilized there being a separate rock shaft for each denomination order thereof. The push rods 233 as hereinbefore stated, are connected to the rate computing rockers 227, 228 and 229. The lower ends of the pull rods 281 are connected to the type sectors constituting the printing mechanism the pounds sectors being indicated by 293, the ounces at 294, the rate at 295 and price at 296. These type sectors are adapted to be oscillated on a shaft 297 (Fig. 25) and are separated by fixed type 298 which are adapted to print the abbreviations: lbs., oz., and the dollar sign ($), the cent (¢) sign being carried by the right hand rate sector which also prints the fraction when the rate includes one such type sector having a lug 299 (Fig. 26) formed integrally thereon to carry the cent sign opposite the fraction. These fixed type are held in fixed position by a bar 300 the ends of which are mounted in upright sections 2 and 4 of the machine frame and extending through holes in upward extensions 301. Downward pull exerted upon the link 275 moves the yoke 280 in the same direction and the movement continues, swinging with it the various movable type sectors 293—294, etc. until the computing pins 174 and computing rockers reach the bottoms of their respective notches at which point further movement of the type sector is prevented, the springs 286 taking up the continued movement of the yoke the downward stroke of which is the same extent for each computation. From this arrangement it will be seen that the type sectors will assume different relative positions according to the depths of the notch in the respective computing members. The means for causing this downward movement is a pair of cams combined to function as one and hereinbefore alluded to as being in operative relation with the arm 273. This combination consists of a single leader cam 302 and a double leader cam 303 both rigidly carried by the shaft 8 and adapted to coact in unison with each other. The arm 273 carries a roller 304 which is adapted to bear upon the periphery of the double leader cam 303 and an assisting lever 305 having one end pivotally mounted on the arm 273 as at 306 carries a roller 307 adapted to bear upon the periphery of the cam 302 the free end of the lever being resiliently connected to a bar 308 by a comparatively heavy helical spring 309. The purpose of the spring is to maintain the roller 307 in bearing relation with its cam and to assist in affecting the downward pull upon the pull rods by exerting tension upon the arm 273 through the medium of a lug 310 carried by the arm 305. The single leader cam is provided with an abrupt fall 312 and the double leader cam a more gradual one, 313, and the former is timed to occur immediately in advance of the latter in order that the full tension of the spring 309 may be exerted upon the arm 273 when it commences its downward swing. The commencement of this downward movement signals the computing stroke of the pins and rockers respectively. When the roller 304 reaches the lower end of the fall 313 the computing stroke has been completed and such roller then rides along a portion 314 of substantially uniform radius during which time the printing mechanism comes into action. A rise 315 on the single leader cam is also in advance of the rise 314 on the double leader cam and is of a contour to effect a quicker action than the other in order that the roller 304 will be relieved of the tension 309 just before it commences its upward movement. During this upward movement the various mechanisms are returned to their initial positions.

*Printing mechanism.*

The printing mechanism consists of the type sectors hereinbefore mentioned, means for aligning the sectors, a hammer mechanism, a paper carrying roll and a ribbon mechanism.

The means for aligning the type when they are swung to their respective positions indicating the results of the computations consists of an alignment bar 316 the upper side of which presents an edge 317 of acute angular cross-section adapted to engage the notches 318 in the lower edge of a plate 319 rigidly carried by each of the type sectors and curved concentrically to the shaft 297. The bar is automatically swung up and registers with the notches immediately above it when the type sectors are in printing position by a lever 320 of angular form the lower end of which carries a roller 321 bearing upon the periphery of a cam 322 rigidly mounted on the shaft 8. The opposite ends of a spring 323 are connected to a portion 324 of the machine frame and a tail 325 formed integrally with a sleeve 326. This sleeve is rotatably mounted upon a stub shaft 327 and has a pair of arms 328 carrying the alignment bar between them. The hammer proper is illustrated at 329 and is carried by arms 330 and 331. A sleeve divided into end parts 332 and 333 and an intermediate part 334 is rotatably mounted upon a shaft 335 and such end parts have formed integrally therewith the arms 330 and 331. The parts of this sleeve have interengaging shoulders 336 and 337 the latter being spaced a slight distance apart to permit of relative movement in one direction. The hammer is adapted to be actuated by a cam 338 rigidly mounted upon the shaft 8 and bearing against a roller 339 carried by a lever 340 formed integrally with the intermediate part 334 the latter having a second lever 341 extending downwardly and resiliently connected to an adjacent portion of the machine frame by a spring 342. A second spring 343 connects such last mentioned lever to a transverse wire 344 connected to the hammer arms. A limiting tail 350 extends radially from the intermediate part 334 and is adapted to engage an abutment 351 on the machine frame. The object in dividing the sleeve carrying the hammer into three parts with relative movement therebetween is to cause the hammer, when released by the cam 338, to swing into engagement with the ribbon under its own impetus and then drop clear of the latter thereby securing a staccato-like action. The paper feed which is indicated at 355 is fed from a roll 356 mounted on a shaft 357 to the printing point between the type and the ribbon, 358, this ribbon passing over guides 359 and having its ends wound on spools 360 which may be rotated by any preferred means.

*Indicating mechanism.*

In order to indicate to the purchaser the results of each computation the machine frame is provided with an upward extension consisting of a pair of upright sections 375 and 376 which are mounted upon the topmost bar 6 forming part of the main machine frame. These upright sections are braced by longitudinal bars 377. Journalled in these sections is a shaft 378 upon which are freely mounted a plurality of indicating wheels 379 preferably ten in number. These wheels are spaced throughout the shaft as follows: pounds, ounces, rate and price. Each of these wheels consists of a comparatively light disc having its circumference bent at right angles to its main area to present a circumferential flange 380 the outer surface of which represents the values computed. A hub 381 (Figs. 31 and 32) is rigidly mounted upon the shaft 378 within the chamber presented by each of these wheels and this hub is provided with a pair of arms 382 and 383 the free end of the arm 382 being bent at right angles to its main length and split to receive one of a spiral spring 384, the opposite end of this spring being connected to its adjacent wheel. The free end of the other arm 383 is adapted to engage a stop 385 mounted rigidly upon and extending from the flange of the wheel. On the other side of each wheel and rigidly carried thereby is a spiral controlling member 386 presenting shoulders 387 with which a pawl 388 is adapted to engage for the purpose of preventing further rotation of the same. This pawl is carried by a shaft 389 and is in the form of a bell crank lever the other arm of which is connected by a substantially vertical link 390 and arm 391 to the rock shaft of its respective computing mechanism.

When a computing operation is taking place the downward pull on the yoke 280 moves the computing pins and rockers into engagement with the respective computing members as hereinbefore mentioned. The shafts 290 and 291 which are rocked by this action cause the pawls to move to a predetermined extent towards the peripheries of their respective spiral members consequently when the wheels are rotated by means to be presently described each will have a different extent of rotation due to the position of its pawl relatively to the spiral member, the rotating action continuing only until the shoulder 387 moving in the arc intersected by the upper end of the pawl engages the latter.

The means for causing rotation of the wheels consists of a drum 392 (Fig. 39) containing a spiral spring 393 the ends of which are connected respectively to the drum and the shaft 378. Upon the periphery of this drum is wound a tape 394 which passes downwardly over pulleys 395 to an arm 396 to which it is connected, this arm carrying a roller 397 bearing against a cam 398 mounted upon the shaft 8 the cam being timed to exert a pull on the tape and consequently affect rotation of the shaft 378 when the pawls have moved into their controlling positions, the rotation of the shaft being transmitted to each of the wheels through their respective springs 384. When the wheels have moved to their proper indicating positions each is locked by an arm 399 one end of which is rigidly mounted on a shaft 400. This arm is provided with an upwardly projecting lug 401 of angular form which is adapted to enter one of a circumferential series of openings 402 in the flange 380 such openings being located between the figures representing the values computed. The arms 399 are swung into their locking positions by a spring 403 one end of which is connected to the machine frame adjacent to shaft 8 while the other end is connected to an arm 404 having a roller 405 in bearing relation with a cam 406 one end of the arm being pivoted on a shaft 407 while its opposite end is connected to the lower end of a link 408. The upper end of this link is connected to a comparatively short arm 409 rigidly mounted on one end of the shaft 400. The cam 406 is provided with a fall 410 and rise 411 and its main area is of substantially uniform radius for the purpose of maintaining the arm 404 raised against the tension of spring 403 and consequently maintaining the locking lugs out of engagement with their respective wheels. The fall 410 permits the arm to drop an extent sufficient to exert a pull on link 408 and arm 409 thereby rotating shaft 400 and moving the arms 399 into their locking positions. Simultaneously with this locking action the results of the computation are exposed to the view of the purchaser through an aperture 415. This is effected by a shutter 416 of substantially U-form straddling the series of wheels and having its arms bearing on the shaft 378 the arms being counterweighted at 417. An operative connection between the end arms of the locking arms 399 and the arms of the shutter is effected by links 418. The indicating wheels are adapted to be exposed to view until the next computing operation. The cam 398 is so timed that it will cause one complete revolution of the shaft 384 for each computing operation and as the wheels will have different extents of rotation due to the position of their controlling pawls 388 each spiral spring 384 will take up the continued rotation of the shaft 378 when its respective wheel comes to a stop. When the wheels are released they will spring around until they resume their initial positions relatively to the shaft 378 and such shaft will then be returned to its initial position by spring 393 (Fig. 39) within drum 392 carrying the wheels with it.

*Advertising mechanism.*

Mounted upon a pair of hollow standards 450 and 451 and straddling the extension of the machine frame containing the indicating mechanism is a cylindrical casing 452 having its ends closed as at 453 and 454 such casing having a longitudinal opening 455 therein on the purchaser's side. Within this cylindrical casing is adapted to rotate a glass tube 456 which is rigidly held between a pair of discs 457 and 458 located at opposite ends of the casing. The discs are connected by longitudinal rods 459 connected to and having their ends projecting through the discs and having nuts 460 thereon. The disc 457 is rotatably mounted upon a hollow shaft 461 rigidly carried by the end 453 the inner end of such shaft having mounted thereon a socket 462 for an electric bulb 463, such socket being included in an electric circuit by wires 464 passing through the standard 450 and connected to terminals 465 on the block 75. The other disc 458 is mounted upon a stub shaft 470 upon which is rigidly mounted a ratchet wheel 471 rotation of which is limited in one direction by a pawl 472 pivoted as at 473 to the adjacent wall 474 of the end 454 such ratchet wheel being actuated by a pawl 475 formed on the upper offset end of a pull rod 476 the lower end of which passes down through standard 451 and is connected to the yoke 280 so that with every computing operation the glass tube will be rotated a distance equal to one tooth on the ratchet wheel. The tube is adapted to carry or contain advertising matter or additional information relating to the goods purchased.

*Operation.*

When an article is placed on the platform of the scale, the rack 23 is pulled downwardly thereby rotating pinion 22 and wheel 509 until the latter balances, the reading on the wheel opposite the index line (not shown, but which is disposed in alignment with the axis of pinion 22, Fig. 1) being the weight of the article. If the weight proves satisfactory to the purchaser, the rate key representing the price per pound thereof, is depressed. This action swings down the arm 224 until its notched end is in position to intersect the path of the rockers 227, 228 and 229 and through pull rod 248 and locking pawl 250 releases the price wheel representing multiples of such rate from the guide bar 170 and permits pawl 255 to lock it to the U-bar. The starting key is then pressed thereby closing the switch 61 and moving gears 59 and 60 into intermeshing relation. This action sets in motion the motor 54 and consequently shaft 8 which shaft is responsible for the actuation of the various mechanisms. Almost immediately with the commencement of rotation of the shaft 8 the pawl 29 moves into engagement with the teeth of the annulus 28 and locks the same against further rotation. Simultaneously the cam 216 moves out of bearing relation with the roller 215 thereby permitting the spiral spring 190 to rotate the drum 191 carrying with it the U-bar, pound and ounce computing wheel and the price wheel which has been released. These wheels will be permitted to rotate until the stop 96 engages the pin 95 mounted on the annulus 28 at which point pawl 100 is swung into engagement with the teeth of the annulus 97 and the movement is finally stopped by the arm 106 swinging behind tail 105 of the pawl. The computing wheels have now reached their computing positions. At this point the rollers 304 and 307 carried respectively by the arm 273 and its assisting lever 305 have commenced to ride down the fall in each of their respective cams, and this downward movement through the various operative connections hereinbefore described is transmitted to yoke 280 which in turn through the pull rods connected to the two series of rock shafts 290 and 291, simultaneously respectively moves the computing pins and rockers into engagement with their respective computing members, swings the type sectors to positions with the type at the printing point representing the weight of the article, the rate per pound and total price, moves the pawls 388 into positions which when the indicating wheels are rotated by cam 398 will bring the numerals corresponding with the results to be printed by the type sectors, opposite the aperture 415, and through pull rod 476 and pawl 475 rotates the ratchet wheel 471 one tooth and consequently rotates the glass tube 456, bringing other advertising subject-matter to view. The roller 304 is now riding along the portion 314 of its cam so that the hammer of the printing mechanism may come into action. The type sectors are now aligned by the alignment bar 316 swinging up into engagement with the notched plate 319 and almost immediately that the alignment has been effected, roller 339 reaches the abrupt fall in cam 338 thereby permitting the hammer 329 to swing up sharply under the tension of spring 342, about this time the indicating wheels are locked. The roller 304 now starts to move up the rise in its respective cam thereby returning the computing pins and rockers and the various pawls to their initial positions. The indicating wheels are as hereinbefore stated locked by the lugs 401 and the cam 406 for actuating these locking devices is so timed that such devices will be maintained in their locking positions until the commencement of the next computing operation. As soon as the type sectors are in position to print they are aligned by the alignment bar 316 which is actuated by the cam 322, the hammer then following up by delivering a sharp blow as the roller 339 reaches the fall in the cam 338. The printing now being completed cams 302 and 303 through arm 273 and its assisting lever 305 return the type sectors, computing rockers and computing pins to their initial positions, and as soon as the pins are clear of the peripheries of the wheels with which they have been in contact the cam 216 comes into bearing relation with its roller 215 and through the bell crank lever carrying the same, shifts the rack 210 towards the rear thereby revolving the U-bar 178 which moves with it the weight computing wheel and the price computing wheel which was originally released. When the projections 177 on the computing wheels have come into contact with the guide bar 170, cam 243 throws out the locking bar 234 and releases the rate lever which was depressed. This lever, as it returns to its normal position, moves back pawl 250 into position behind lug 252 thereby locking its price computing wheel in position.

All the mechanisms have now been returned to their initial positions with the exception of pawl 29 which locks the annulus 28 and this pawl is released by the pawl 43 reaching the fall 41 in cam 40. The gears 59 and 60 are now thrown out of intermeshing relation and the switch 61 opened by the striking hammer 87 against arm 86 such action being caused by arm 90 reaching the abrupt fall 92 in cam 91. The impact of the hammer against the arm 86 swings the main locking pawl 83 and its auxiliary pawl 701 to the rear and disengages the free ends of the carrying arm 62 and lever 65 therefrom, the switch being open the machine comes to a stop thereby signalling the completion of one computing operation.

Certain features of the present invention directed particularly to the weighing scale features are claimed in a co-pending divisional application, Serial Number 696,764, filed March 4th 1924.

What I claim is as follows:

1. A computing machine comprising a controlling device for determining the extent of operation thereof, and means for locking and unlocking the said device, said means comprising in combination with a toothed member of the controlling device, of a pawl cooperating therewith to lock the device when engaged with the toothed periphery of said member, and to unlock the same when disengaged therefrom, and means for operating the said pawl from a controlling cam shaft in the computing machine, said means comprising an operating connection including a yielding means for the purpose described.

2. In a computing machine the combination with a rotary computing member, of means for differentially limiting the movement thereof in accordance with the displacement of a movable stop, said means comprising a fixed element, a differential moving in unison with the computing member and adapted to determine and limit its position when engaged by said stop, said differential including a pawl, a pin connected to the pawl and movable in the path of the stop and adapted to displace the pawl into locking engagement with the fixed member, and means for preventing the displacement of the pawl from such locking position.

3. In a computing machine, the combination with a rotary computing member, a fixed device and a movable stop adapted to determine the position of the computing member; of locking means constructed and arranged to rotate in unison with said member and lock the same when engaged by the stop, said means including a pawl, a pin movable in a path intersected by the stop, means operatively connecting the pin to the pawl for the purpose of moving the latter into locking engagement with the said device, and means for preventing displacement of the pawl from such locking position said means consisting of a tail upon the pawl and a lever rotatable in unison with the pawl and constructed and arranged to move behind the said tail.

4. In a computing machine, the combination with the machine frame, a shaft, a rotary computing member mounted upon said shaft, a toothed circular member mounted in fixed position upon the machine frame concentric to the shaft, and a stop movable in a path concentric to said shaft to determine the position of the computing member; a lever rigidly mounted between its ends upon the said shaft, an arm extending substantially parallel to said lever and being freely mounted upon the shaft, a spring connecting one end of the arm to the adjacent end of the lever, means located between said ends for limiting relative movement in one direction, a pawl pivotally mounted upon the other end of said arm, means movable in a path intersected by the stop and operatively connected to the pawl for moving the same into engagement with the said toothed member, a tail upon the pawl, the adjacent end of said lever being adapted to swing behind the tail when the pawl is in locking position.

5. In a computing machine, rate computing mechanism consisting of a plurality of rockers, a series of aligned bell crank levers the free end of one of the arms of each of which is of increased width and notched, a manually operated key operatively connected to the other arm and constructed and arranged to move the notched arm across the path of the rockers, means yieldingly maintaining said notched arm out of the said path and means for locking any one of the said levers in position with its notched end intersecting the path of the rockers, said means consisting of a shoulder upon each of said notched ends, a locking bar extending from end to end of the series of levers and in close proximity to the said shoulders and adapted to be engaged by the latter, a cam for releasing said levers and an arm in operative engagement with said cam and rigidly connected to the locking bar.

6. In a computing machine, the combination with the machine frame, a shaft, a plurality of computing wheels mounted upon said shaft and rotatable independently of each other thereon, means for locking each of said wheels in non-computing position, mechanisms for releasing the computing wheels, a device mounted on said shaft and rotatable in unison therewith and extending parallel thereto in close proximity to the peripheries of the wheels, and locking means upon each of the wheels adapted to engage said device and lock its computing wheel thereto when such wheel is released.

7. In a computing machine, the combination with the machine frame, and a shaft, of a plurality of computing wheels mounted thereon and rotatable independently of each other, each of said wheels having a radial projection, a bar mounted in fixed position upon the frame in close proximity to the peripheries of the wheels, a device of U-form mounted upon said shaft and straddling the wheels said device being adapted to engage said radial projections and move them into contact with the bar for the purpose of aligning the wheels in non-computing position, means for locking the wheels in such position, and means mounted upon each of the wheels and constructed and arranged to engage the said device when the wheel is released.

8. In a computing machine, the combination with the machine frame, rate computing mechanism including a lever and a manually operated rate key connected to the lever, of a shaft and a computing wheel mounted thereon and means for locking the wheel in non-computing position said means consisting of a lug upon the wheel, a pawl fulcrumed in the machine frame adjacent the periphery of the wheel and adapted to engage said lug, a pull-rod operatively connecting said pawl to said lever, a U-bar mounted upon said shaft and rotatable in unison therewith, and straddling said computing wheel, a second pawl operatively mounted on said wheel and adapted to engage said U-bar for the purpose of causing the computing wheel to rotate in unison therewith when released, said second pawl having an integral laterally extending flange adapted to be engaged by the first-mentioned pawl when the latter is in locking position for the purpose of maintaining the second pawl out of the path of the U-bar and a spring connecting the second pawl to its computing wheel and adapted to give the former a tendency to move across such path.

9. In a computing machine the combination with a machine frame, of a shaft, a hub mounted on said shaft in close proximity to one end and having an axial extension, a computing wheel rigidly mounted on said hub, a member of cup-like form rigidly mounted upon the machine frame in the axial plane of the shaft and adapted to receive the free end of said extension, antifriction balls between said member and extension, a bearing member keyed to said shaft in close proximity to its opposite end, a sleeve encircling said shaft between the hub and said last-mentioned bearing member and antifriction balls between the opposite ends of the sleeve and said hub and bearing member, a series of computing wheels mounted upon said sleeve and rotatable independently of each other, a member of cup-like form mounted upon the machine frame adjacent said last-mentioned bearing member, a collar rigidly keyed to the shaft and having a circumferential flange located within said last-mentioned cup-like member, a disc adjustable upon said cup-like member and antifriction balls between said flange and disc.

10. In a computing machine, the combination with the machine frame, a shaft, means for rotating the same to variable angular extents, a bar mounted in fixed position on the machine frame, and a plurality of computing wheels mounted on said shaft each having a radial projection adapted to engage the bar when in non-computing position adjacent the peripheries of the wheels; of a device extending from end to end of the computing wheels and constructed and arranged to cause the same to individually rotate to and from computing position, and means effecting an operative connection between the device and said shaft whereby a continued rotation of the shaft to a limited extent is permitted 11. In a computing machine, the combination with the machine frame, a shaft, a plurality of computing wheels mounted upon said shaft and rotatable independently of each other thereon, means for locking each of said wheels in non-computing position, mechanisms for releasing the computing wheels, a device mounted on said shaft and rotatable in unison therewith and extending parallel thereto in close proximity to the peripheries of the wheels, and locking means upon each of the wheels adapted to engage said device and lock its computing wheel thereto when such wheel is released, a spiral spring encircling said shaft for rotating the same to computing position, and means for returning the shaft to non-computing position, said means consisting of a pinion rigidly mounted on said shaft, a rack in intermeshing relation with the pinion, a bell crank lever fulcrumed in the machine frame and having one of its arms operatively connected to the rack, and a cam in bearing relation with the other arm of the lever.

12. In a computing machine, the combination with the machine frame, a plurality of aligned horizontally disposed rock shafts journalled in the machine frame near the top thereof and a series of arms extending laterally from said shafts; of computing mechanisms including pins and rockers, the pins being of elongated form and pivotally connected to some of said arms, push rods operatively connecting the rockers to some of said arms, printing mechanism including type sectors, pull-rods having their upper ends connected to some of said arms and their lower ends to said upper sectors, each of said pull-rods having an enlargement on its lower end and a short distance therefrom, a yoke having the pull-rods extending slidably therethrough, springs encircling the pull-rods and bearing between the underside of the yoke and the enlargements, collars rigidly mounted upon the pull-rods immediately above the yoke, a cam and means operatively connecting the same to the yoke whereby the latter is vertically reciprocated.

13. In a computing machine, the combination with the machine frame, computing mechanisms including pins and rockers, of means for moving said pins and rockers to and from computing position said means including a double leader cam and a single leader cam in close proximity thereto, an arm having a roller in bearing relation with said double leader cam, a lever one end of which is fulcrumed on said cam and having a roller adapted to bear upon said arm and a second roller adapted to bear upon the single leader cam, a spring connected to said lever and the machine frame and exerting tension on the former the fall and rise in the single leader cam being slightly in advance of the fall and rise in the double leader cam whereby the tension of the spring consists in moving the pins and rockers to computing position and is neutralized when the same are being returned to initial position.

14. In a computing machine, the combination with the machine frame having an aperture therein, computing mechanism, of mechanism for indicating the results of the computations consisting of a shaft, means for rotating said shaft substantially one revolution for each computing operation, a series of indicating wheels mounted upon said shaft opposite the aperture, means effecting a resilient connection between each of the wheels and the shaft, a series of controlling mechanisms operatively connected to said computing mechanism, each mechanism of the series being adapted to control one of the indicating wheels, means adapted to close said aperture and to automatically open the same when such computations have been effected.

15. In a computing machine, the combination with computing mechanism, of mechanism for indicating the results of the computations consisting of a shaft, means for rotating said shaft substantially one revolution for each computing operation, a series of indicating wheels mounted upon said shaft, means effecting a resilient connection between each of the wheels and the shaft, a series of controlling mechanisms operatively connected to said computing mechanism, each mechanism of the series being adapted to control one of the indicating wheels.

16. In a computing machine, the combination with the machine frame having an opening therein and computing mechanism, of mechanism for indicating the results of the computations consisting of a shaft journalled in the machine frame, means for rotating said shaft substantially one revolution for each computing operation consisting of a drum mounted upon said shaft, a spring within the drum, a tape wound upon the drum, a cam, a lever in operative relation with said cam and having the free end of the tape connected thereto, a series of indicating wheels mounted upon said shaft rotatable independently of each other each wheel having a hub, a second hub rigidly mounted upon said shaft adjacent each of said wheels, a spiral spring wound upon the hub of each wheel and having one end connected thereto, a pair of radially extending arms upon said second hub, one of said arms being connected to the other end of said spiral spring, a stop upon each wheel adapted to be engaged by the other arm for the purpose of limiting rotation of each wheel relatively to the adjacent second hub, a controlling member rigidly mounted upon each wheel and presenting radial projections and a series of pawls operatively connected to said computing mechanism and constructed and arranged to be moved to and from said controlling members.

17. In computing mechanism for a computing machine, the combination with a manually operated member, a fixed part of the machine, computing wheels, and a device for actuating the wheels individually, of a lock for locking a computing wheel to its actuating device; a lock for locking the computing wheel to the fixed part; means for causing the last mentioned lock to operate the lock for locking the wheel to its actuating device; and means whereby an operation of the manually operated member of the machine operates the lock for locking the wheel to the fixed part.

18. In a machine for weighing merchandise and computing the value thereof, the combination with the machine frame and a rotary weight indicating device having a laterally projecting pin, of a rotary member, a toothed member rigidly mounted upon the machine frame, a lever rotatable in unison with the rotary member and having one end movable in a path intersected by said stop, a pawl operatively connected to the opposite end of said lever and constructed and arranged to engage said toothed member when the lever engages the stop.

19. In a computing scale, in combination, weighing mechanism, means for locking the same in displaced position, computing mechanisms comprising a plurality of rate devices and a single weight device, means for operating the weight device and one and only one of the rate devices concurrently to an extent determined by the weighing mechanism, means for automatically locking the computing mechanisms in their result determined position, means for concurrently taking off readings of weight and computed cost from the said weight and rate devices.

20. In a machine for weighing merchandise and computing the value thereof, weight indicating mechanism operated by the scale, a series of independently movable price-representing devices, means for locking the devices, means for releasing the device individually and separately according to the price to be computed, and means for operating the released device for the purpose of computing the said price relatively to the weight indicated.

21. In a machine for weighing merchandise and computing the value thereof, the combination with a rotary computing member and means for locking the same against rotation, of a rate-indicating manually-operated member and means operatively connecting the said manually operated member to the locking means whereby the computing member is released when the rate member is operated.

22. In a machine for weighing merchandise and computing the value thereof, the combination with a plurality of rotary computing members rotatable independently of each other, locking mechanisms preventing rotation of the members, a plurality of manually operated rate indicating members, and means for effecting operative connections between the rate indicating members and said locking mechanisms whereby when a rate indicating member is operated its respective computing member is released.

23. In a computing scale in combination with a scale set part, a plurality of computing wheels, a plurality of rate setting devices, differential controlling devices and means for operating the same, wheel actuating devices operating concurrently with the operation of the different controlling devices, and means for selectively coupling a particular computing wheel to said actuating device.

24. In a computing scale in combination a scale set part, differential controlling devices controlled thereby, a plurality of computing wheels, a common positioning means therefor, and means for selectively coupling any desired computing wheel to said positioning means.

25. In a computing scale in combination a scale set part, differentially controlling devices limited in extent of motion thereby, a plurality of computing wheels and a weight wheel, a common positioning means for said wheels controlled in its movement by the differential controlling devices, and rate setting means for selectively coupling a computing wheel corresponding to a particular rate to said positioning means, said weight wheels being at all times coupled to said positioning means whereby said selected computing wheel and the rate wheel move concurrently to their determined position.

26. In a computing machine adapted to obtain a product of two factors, a part which is displaced in accordance with one factor, a plurality of setting devices each corresponding to a particular value of the other factor, a plurality of computing wheels, a common positioning means therefor, a differential controlling device limited in extent of movement by the part displaced in accordance with the first factor, said device having provisions for controlling the extent of movement of the wheel positioning device, and means operable upon the operation of a particular setting device for coupling the computing wheel corresponding thereto to the positioning device whereby upon operation thereof the selected wheel is turned proportionally to the first factor of the computation.

27. The invention set forth in claim 26 in which means is provided for taking a reading of the product from the selected and rotated computing wheel.

28. In a computing scale in combination with printing and indicating mechanism a scale set part, a plurality of computing wheels and a weight wheel, a plurality of rate setting devices, one for each computing wheel, a common positioning device for the wheels, a plurality of take off devices for taking readings from the steps on the wheel, means connecting said take off devices to the indicating and printing mechanism and a differential controlling device having provisions for limiting the extent of movement of the said wheels in accordance with the displacement of the scale set part.

29. In a computing machine, a plurality of computing wheels, a plurality of rate setting devices, means for locking the said wheels in normal position, means operable upon the operation of a rate setting device for unlocking a particular computing wheel, means for rotating the unlocked wheel to a weight determined position and means for taking off a reading of the computed result from the wheel after the same has been moved.

30. The invention set forth in claim 29 in which means is provided for maintaining the other wheels locked during the motion of the unlocked wheel.

31. In a computing scale in combination a part rotarily displaceable in accordance with weight, a plurality of rotary computing means, means for selecting one of said rotary computing means, means for rotating the said selected computing means, said means being adapted to permit the non-selected wheels to remain stationary, means for limiting the extent of such rotation upon engagement with the weight displaced part and means for locking the computing means against further rotation upon the engagement of said means and part.

32. In a computing scale in combination a part which is rotarily displaceable in accordance with weight, a rotary computing means, differential controlling devices intermediate said means and part arranged to limit the extent of rotation of the computing means upon engagement with the part, motive power means for actuating the devices and computing means concurrently, and means, acting directly upon the differential device for locking the differential devices and the computing means upon the engagement of the differential device and said part.

33. In a computing scale in combination a wheel rotarily displaceable in accordance with weight, a lateral projection thereon, rotary computing means, means for rotating said computing means, differential controlling devices rotatable concurrently with said computing means, and elements of said devices having provisions for stopping the computing means upon engagement with the aforesaid lateral projection, said devices also having provisions acting directly upon the differential device for locking the devices and computing means in the arrested position.

34. In a machine for weighing merchandise and computing the value thereof, the combination of a rotary device which is angularly displaceable in accordance with varying weights, a stop carried thereby, a rotary member, a fixedly mounted toothed member, a part arranged to rotate concentrically with said rotary member, a pawl carried thereby means carried by the aforesaid part and movable in a path intersected by said stop for throwing the pawl into engagement with said fixed toothed member when the stop is engaged whereby the position of the rotary member is determined in accordance with the position of the stop and means for taking a reading from the rotary member.

35. The invention set forth in claim 34 in which means is provided for locking the stop prior to the engagement therewith of the cooperating part.

36. In a computing machine, in combination with a computing mechanism, a variably positioned stop therefor, a differentially controlling device for limiting the extent of movement of the computing mechanism in accordance with the position of the stop, said device includes a pair of members and a connection intermediate said members having provisions for permitting a relative movement therebetween and means for locking one of said members.

37. In a computing scale in combination with a plurality of computing wheels, of a plurality of rate setting mechanisms arranged to release for operation their corresponding computing wheels, displaying elements adapted to be differentially displaced to display the amounts of rate and a plurality of denominational bars common to all the rate setting means to actuate the rate displaying elements according to the value of the rate setting device which is operated.

38. In a computing scale in combination with a plurality of wheels comprising computing wheels and a weight wheel, of a plurality of rate setting devices arranged to release for operation their corresponding computing wheels, means for turning the released computing wheel and weight wheel in proportion to the applied load, displaying elements of varying denominational orders for displaying the amount of the rate, weight, and product, a plurality of bars of varying denominational orders and common to all the rate setting means to control the actuation of the rate displaying elements according to the value of the operated rate setting device, take off pins and denomination connecting devices for taking off the amounts of weight and product from the displaced wheels.

39. In a computing scale, in combination a plurality of rate setting devices, a plurality of computing wheels and a weight wheel, means for operating a particular computing and the weight wheel to an extent proportional to the applied load, a plurality of take off devices for taking off readings from the said weight and computing wheels, said take off devices in their operation being ineffective to take off readings from any of the computing wheels excepting such wheels as are displaced in accordance with weight, means operable in accordance with the displacement of the take off devices for displaying the result of the computation and means for displaying the rate and weight.

40. In a computing machine in combination a plurality of groups of wheels, each group comprising a plurality of stepped wheels, each wheel corresponding to a particular denominational order of an amount, a plurality of take off pins for said wheels corresponding in number to the total number of individual wheels in the plurality of groups, a plurality of denominational shafts corresponding in number to the denominational orders of the wheels of a group, connections intermediate said pins and said shafts and amount displaying devices connected to said shafts to display the amount as taken off from any wheel by the pin take off device.

41. In a computing machine in combination a plurality of groups of wheels each group comprising a plurality of individual stepped wheels of varying denominational orders, a plurality of take off pins corresponding in number to the total number of individual wheels in all the groups said pins comprising a plurality of pins of the same denominational order, a plurality of shafts corresponding in number to the denominational orders of the wheels of a single group, connections intermediate the pins of each corresponding denominational order, and the shaft of corresponding order, and amount displaying devices of corresponding denominational orders connected to said shafts to display the amount as taken off from any wheel group by the said pins.

42. The invention set forth in claim 41 in which one wheel group is provided for weight amounts and in which a separate set of shafts and amount displaying devices are provided therefor for displaying amounts of weight as determined by the take off pins associated therewith.

43. The invention set forth in claim 41 in which means is provided for rendering ineffective the taking off of amounts from certain of the stepped wheels.

In testimony whereof I have signed my name to this specification in the presence of two witnesses.

GEORGE R. WOOD.

Witnesses:
   WILLIAM J. C. HEWETSON,
   HAROLD W. ROBERTS.